United States Patent [19]

Underwood

[11] Patent Number: 4,717,299

[45] Date of Patent: Jan. 5, 1988

[54] WHEEL NUT ASSEMBLIES

[75] Inventor: Alan K. Underwood, Pontypridd, Great Britain

[73] Assignee: Armstong Fastenings, Ltd., Pontypridd, Great Britain

[21] Appl. No.: 834,221

[22] Filed: Feb. 27, 1986

[51] Int. Cl.[4] .................................... F16B 31/00

[52] U.S. Cl. .................................... 411/11; 411/368; 411/372; 411/533

[58] Field of Search .................... 411/11, 10, 368, 372, 411/134, 533, 542, 534, 544, 539, 427

[56] References Cited

U.S. PATENT DOCUMENTS

| | | | |
|---|---|---|---|
| 3,135,154 | 6/1964 | Zenzic | 411/12 |
| 3,315,720 | 4/1967 | Gutshall | 411/134 X |
| 4,362,449 | 12/1982 | Hlinsky | 411/531 X |
| 4,431,353 | 2/1984 | Capuano | 411/11 |

FOREIGN PATENT DOCUMENTS

| | | | |
|---|---|---|---|
| 2051285 | 1/1981 | United Kingdom | 411/533 |
| 2127122 | 4/1984 | United Kingdom | 411/11 |

*Primary Examiner*—Gary L. Smith
*Assistant Examiner*—Rodney M. Lindsey
*Attorney, Agent, or Firm*—Cohen, Pontani & Lieberman

[57] ABSTRACT

A wheel nut is formed of a nut body and a seating washer, each having a cooperating engagement surface. The washer engagement surface is spheroidal and of non-constant spherical radius of curvature, and the washer additionally includes a flat bearing surface for engagement with a flat work surface. The washer is formed of a softer material than is the nut body so that, when the wheel nut is tightened against the work surface and about a substantially perpendicular stud projecting therefrom, the spheroidal surface of the seating washer deforms from its initial contact with the nut body surface at only the outer periphery of the washer to contact with the nut body along the entirety of the washer engagement surface.

3 Claims, 3 Drawing Figures

1
18
10
6
13
8
14
11

WHEEL NUT ASSEMBLIES

FIELD OF THE INVENTION

The invention relates to wheel nuts primarily (but not exclusively) to hold wheels of automotive vehicles in position on a supporting rotating structure.

PRIOR ART

Traditionally a vehicle wheel is secured in correct position on the hub by providing a conical seat around the wheel stud and a corresponding bearing face on the wheel nut, so that as a series of these nuts are tightened the wheel is held automatically centered in relation to the studs. While this arrangement is satisfactory for lighter vehicles, it has been found desirable for heavier vehicles to locate the wheel centrally on its hub by means of a spigot or the like, and to use the wheel studs and nuts merely to hold the wheel on the hub and to transmit torque between the wheel and hub.

British Pat. No. 1,389,976 (Erich Neumayer) describes one form of wheel nut which has been used in commerce. A nut body bears on a conical seat in a collar.

British Pat. No. 2,051,285, belonging to the assignee of the present inventor, describes an improved form of two part wheel nut, where the bearing surface of the nut body, and the seat in the washer, are complementary part spherical surfaces, to allow for misalignment of the stud axis in relation to the wheel surface. British Pat. No. 2,065,818 (MacLean-Fogg Company) shows a two part construction where initially the washer has a concave bearing surface, but where the pressure of the nut body deforms the washer so that it sits flat on the washer surface.

OBJECTS OF INVENTION

In spite of the various improvements, it has still been difficult to achieve proper contact between the nut body and washer seat, so as properly to distribute the high stress. Relationship between torque applied on tightening the washer nut and the tension in the stud has been uncertain due to frictional irregularities. There has always been a tendency for nuts to loosen in warm weather and over tighten when the weather is cold. It is the object of the invention to overcome these difficulties, at least to some extent.

BRIEF SUMMARY OF THE INVENTION

With the above objects in mind, the invention provides a wheel nut adapted to bear against a flat work surface and comprising an internally threaded nut body and a seating washer, the nut body having a convex bearing surface and the washer a co-operating concave seating surface both said surfaces being spherical in character whereby to allow freedom of movement between nut body and washer to accommodate misalignment of a co-operating stud which is nominally perpendicular to said flat surface, characterized by the washer having a flat bearing surface to bear on the flat surface, being of softer material than the nut, and having its seating surface initially in contact with the nut body at the outer periphery of said surface and in the tightened condition of the nut making contact over its whole area by virtue of elastic deformation of the washer.

The construction described allows a more even contact between the bearing surface of the nut body and the seat in the washer. This, coupled with the relative softness of the washer leads to reduced, and more closely determined coefficient of friction, so that the torque required to achieve a given tension on the stud is less than for prior arrangements. The washer in compression beneath the nut body acts as a spring washer and takes on a locking function.

DESCRIPTION OF PREFERRED EMBODIMENT

Figure 1:
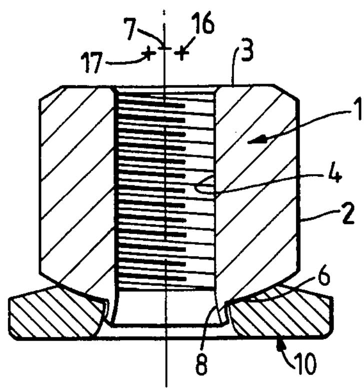
FIG. 1 shows a preferred form of wheel nut in axial section

The wheel nut illustrated comprises a nut body 1 with hexagon flats 2, top 3 and internal threads 4 all of standard configuration. The nut body 1 has also a bearing surface 6 of part spherical shape, centered at a point 7 on the nut axis, and, internally of the surface, a collar 8.

The wheel nut includes also a seating washer 10 with a flat bearing surface 11 to bear on a flat wheel surface 12 surrounding a stud (not shown) extending at a nominal right angle thereto. The washer 10 has a spheroidal seating surface 13 to receive the bearing surface 6 of the nut body 1. The washer 10 has also a frusto-conical interior surface 14. When the nut body 1 is assembled with the washer 10 the collar 8 is expanded outwardly so as to hold the washer captive.

Figure 2:
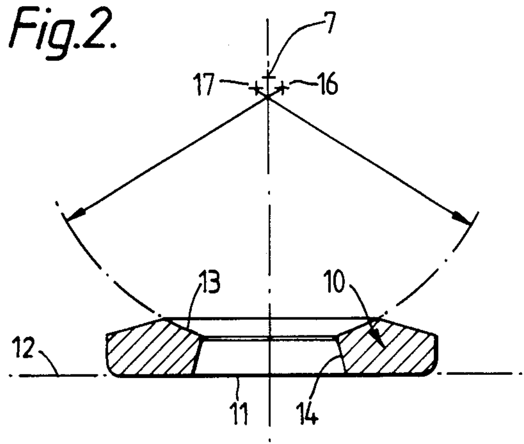
FIG. 2 is an axial section of a washer alone

The washer 10 is formed by coining to have the shape shown in FIG. 2. The spheroidal surface 13 is formed by a punch having a true spherical head of the same diameter as that of the nut body bearing surface 6 but going towards its inner edge the surface 13 is progressively more recessed than a truly spherical surface would be, assumed centered on the washer axis. In the section shown, opposite sides of the washer surface 13 are seen centered at points 16, 17 which are offset to opposite sides of the axis.

Figure 3:
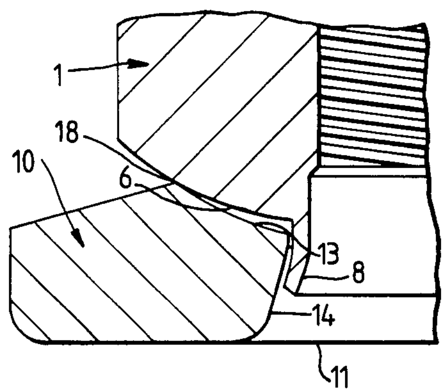
FIG. 3 is an axial section of a portion of the FIG. 1 construction on a greater scale.

On assembly of the nut with a wheel stud, before any stress is applied, the nut body 1 bears on the washer 2 as shown in FIG. 3. Initial contact is made at the outer periphery 18 only of the surface 13, and the gap between nut body and washer increases going inwardly.

When the nut is tightened against the wheel surface 12 the nut body elastically deforms the washer to produce full area contact between the two. Any misalignment of the stud is accommodated by relative movement of the engaging nut and washer surfaces before full clamping force is applied.

When the nut is removed, the washer regains its original shape, ready for the next application.

The nut body is preferably made of medium carbon steel, hardened and tempered. Washers, particularly those of special profile, are commonly made by forging. By contrast the washer 10 of this preferred embodiment is made by parting off a length of thick-walled mild steel tube in the as-drawn condition and coining it to the shape illustrated, without further treatment. The washer, therefore is work-hardened to some extent but will have a much lower hardness than the nut body.

When the surfaces 6, 13 of nut and washer are in full contact the harder surface 6 on the nut body will make the less hard surface 13 of the washer conform to it. In effect the nut beds into the washer. It will be appreciated that the grain formation in the washer is essentially longitudinal, and not as it would be in a forged washer.

The conditions therefore favour reliable contact between the surfaces and it has been found that there is an appreciably lower coefficient of friction in the construction described than in comparable prior art nuts.

The reduced coefficient of friction leads to a lower torque requirement for a given clamping force, and to a more reliable relationship between torque and clamping force. Because of the elasticity of the washer more angular movement is required to tighten or loosen the nut, with a given clamping force.

I claim:

1. A wheel nut adapted to bear against a flat work surface and comprising an internally threaded nut body and a seating washer, the nut body having a convex bearing surface and the washer a cooperating concave seating surface, both said surfaces being spherical in character whereby to allow freedom of movement between said nut body and said washer as the nut body is moved from an initial to a tightened condition to accommodate misalignment of a cooperating stud disposed nominally perpendicular to said flat surface;

said washer having a substantially centrally-disposed opening for receiving the stud, a flat bearing surface for continuous flat bearing engagement with the flat work surface along the entirety of said bearing surface, a continuous peripheral sidewall extending between said flat bearing surface and said concave seating surface, and a solid cross-section between said bearing surface and said seating surface and between said centrally-disposed opening and said peripheral sidewall, said washer being formed of softer material than said nut body and having its seating surface initially in contact with the nut body at the outer periphery of said surface and in the tightened condition of the nut body making contact over its whole area by virtue of elastic deformation of the washer.

2. A wheel nut as claimed in claim 1 wherein the nut body is formed of medium carbon steel hardened and tempered and the washer is formed of mild steel.

3. A wheel nut adapted to bear against a flat work surface and comprising an internally threaded nut body and a seating washer, the nut body having a convex bearing surface and the washer a cooperating concave seating surface, both said surfaces being spherical in character whereby to allow freedom of movement between said nut body and said washer as the nut body is moved from an initial to a tightened condition to accommodate misalignment of a cooperating stud disposed nominally perpendicular to said flat surface;

said washer having a flat bearing surface for continuous flat bearing engagement with the flat work surface along the entirety of said bearing surface and said washer being formed of softer material than said nut body and having its seating surface initially in contact with the nut body at the outer periphery of said surface and in the tightened condition of the nut body making contact over its whole area by virtue of elastic deformation of the washer;

wherein the washer is formed of drawn metal tube which is then coined, the grain of the metal extending longitudinally therethrough.

* * * * *